Aug. 6, 1929. H. C. MEYER 1,723,194
KETTLE STIRRING DEVICE
Filed Dec. 18, 1926

INVENTOR:
Hettie C. Meyer
BY David E. Carlsen.
ATTORNEY.

Patented Aug. 6, 1929.

1,723,194

UNITED STATES PATENT OFFICE.

HATTIE C. MEYER, OF GRANITE CITY, ILLINOIS.

KETTLE STIRRING DEVICE.

Application filed December 18, 1926. Serial No. 155,704.

My invention relates to a stirring device for kettles used for cooking preserves and the main object is to provide a simple and efficient device to prevent the contents being cooked from sticking to the bottom and also to thoroughly stir said contents as needed without removing the kettle cover.

Figure 1:
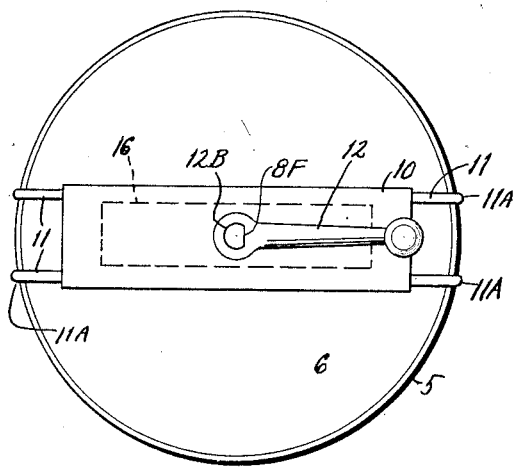
Fig. 1 is a top view of a kettle with a cover and a preferred form of my device in operative position.
Figure 3:
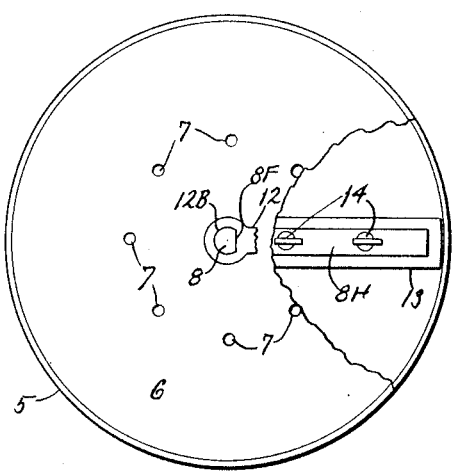
Fig. 3 is a partly sectional top view of a kettle and a modified form of my device.

Referring to the drawing by reference numerals 5 designates any suitable kettle of the kind ordinarily used for cooking preserves, said kettle having a cover 6 which may have a number of vents 7. In this type of kettle there is a bead or flange 5F at the upper edge, the cover is of any suitable form at its perimeter to snugly fit and entirely close the top of the kettle.

Figure 2:
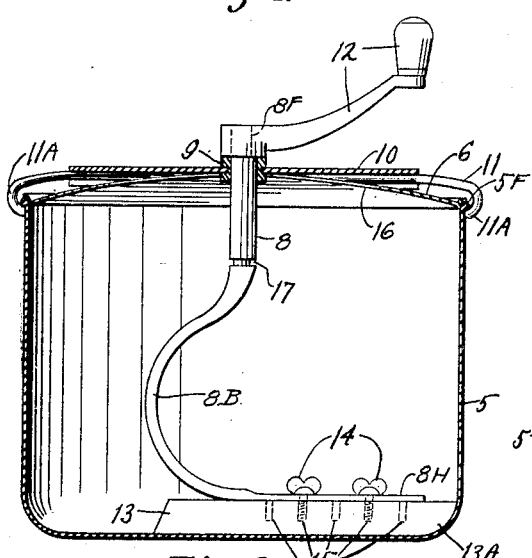
Fig. 2 is a central sectional elevation of Fig. 1.

My device comprises a vertical crank shaft 8 rotatably and slidably mounted in a vertical bearing 9 in the center of cover 6 or said bearing may be fixed in the center of an elongated bridge member comprising a sheet metal plate 10 beaded at its edges to retain two parallel wires 11 hooked downwardly at their ends as at 11A to frictionally engage the diametrically opposite parts of the kettle top edge 5F as in Figs. 1 and 2. This bridge may be put in place over the kettle cover as shown or used without said cover.

The crank shaft 8 protrudes above bearing 9 where it may be flattened as at 8F on one side to receive the correspondingly shaped bore 12B of a hand crank 12, and said shaft 8 extends also below the bearing a predetermined distance from whence it is bent in bow form 8B in a vertical plane to a horizontal plane, being flattened as at 8H at the latter extremity.

13 is an elongated wooden block removably fixed to the under side of the arm 8H of the crank shaft by means of thumb screws 14. This block is preferably a little longer than the radius of the kettle bottom and its outer end curved upwardly as at 13A to correspond to the curvature of the outer part of the kettle bottom. 15 is a row of threaded holes in the top of block 13, any suitable pair of which may be engaged by the thumb screws 14 when the outer end of the block is properly located according to the diameter of the kettle.

16 is an elongated aperture in the top of the kettle cover (Figs. 1 and 2) through which block 15 and crank 8 may be inserted to place the latter in operative position, the said aperture being normally covered by the bridge member 10.

Figure 4:
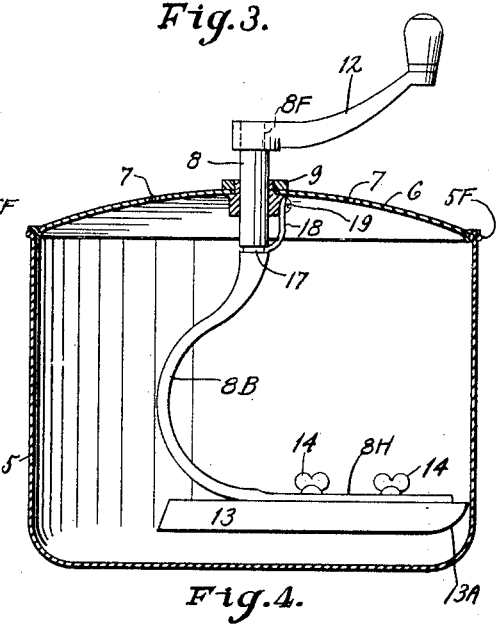
Fig. 4 is a central sectional elevation of Fig. 3, showing the scraping and stirring member in elevated position.

17 is a circular groove in the bottom part of shaft 8 and adapted to be engaged by the free end of a spring arm 18 fixed adjacent thereto as at 19 on bearing 9 in Fig. 4, said groove being engaged only when the crank shaft is raised to lift the block 13 clear of the kettle bottom.

In the use of my device it is obvious that by turning the crank 12 with the block 13 bearing on the bottom of the kettle (Fig. 2) the latter is readily scraped clear at all times thus preventing preserves or other ingredients from sticking to the bottom. When the block is not in use it may be raised as in Fig. 4 or even used as a stirring device when thus raised. The block 13 is preferably wood for best results for any other material such as a metal has been found to be impractical since there is danger of metal particles getting mixed in the ingredients whereas wood against metal keeps the latter clean and prevents sticking of ingredients on the metal bottom of the kettle.

It is obvious that the upper end of shaft 8 may be polygonal in form and removably engaged by lever 12, the groove 17 and spring 18 may be omitted and other variations of construction embodied without departing from the spirit and scope of the invention.

I claim:

In a rotary stirring device for kettles and the like and comprising a vertically disposed crank shaft concentric of the vessel, a hand crank on said shaft and means for raising and holding said crank shaft in a predetermined elevation; said crank shaft formed of a bow shape in vertical plane and the lower part flattened and arranged in horizontal plane, a single elongated stirring member removably fixed diametrically of the kettle to the lower side of the flattened crank part and adapted to normally engage the bottom of the kettle and means for adjusting said stirring member radially, and said member formed with a mainly straight bottom face curved upwardly at its end for the purpose set forth.

In testimony whereof I affix my signature.

HATTIE C. MEYER.